(12) United States Patent
Bakhmutsky

(10) Patent No.: US 9,207,454 B1
(45) Date of Patent: Dec. 8, 2015

(54) SYSTEM AND METHOD FOR DUST CONTAMINATION PREVENTION AND REMOVAL IN FIBER-OPTIC PANEL-MOUNT ASSEMBLIES

(71) Applicant: Cadence Design Systems, Inc., San Jose, CA (US)

(72) Inventor: David Bakhmutsky, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 323 days.

(21) Appl. No.: 13/842,983

(22) Filed: Mar. 15, 2013

(51) Int. Cl.
*G02B 6/00* (2006.01)
*G02B 27/00* (2006.01)
*G02B 6/44* (2006.01)

(52) U.S. Cl.
CPC .......... *G02B 27/0006* (2013.01); *G02B 6/4452* (2013.01); *B08B 2205/00* (2013.01); *B08B 2240/02* (2013.01)

(58) Field of Classification Search
None
See application file for complete search history.

(56) References Cited

U.S. PATENT DOCUMENTS

| 5,325,454 | A | 6/1994 | Rittle et al. | |
| 5,925,191 | A * | 7/1999 | Stein et al. | 134/6 |
| 6,044,193 | A | 3/2000 | Szentesi et al. | |
| 6,053,985 | A * | 4/2000 | Cheswick et al. | 134/6 |
| 6,215,939 | B1 | 4/2001 | Cloud | |
| 6,619,854 | B2 | 9/2003 | Kiani | |
| 6,744,962 | B2 | 6/2004 | Allerellie | |
| 6,839,935 | B2 * | 1/2005 | Kiani et al. | 15/345 |
| 7,239,789 | B2 | 7/2007 | Grubish et al. | |
| 2003/0221710 | A1 * | 12/2003 | Young | 134/22.14 |
| 2004/0033050 | A1 * | 2/2004 | Lytle et al. | 385/147 |
| 2007/0196056 | A1 | 8/2007 | Gerhard | |
| 2007/0196069 | A1 * | 8/2007 | Shibata et al. | 385/134 |

FOREIGN PATENT DOCUMENTS

DE 10030291 1/2001

* cited by examiner

*Primary Examiner* — Tina Wong
(74) *Attorney, Agent, or Firm* — Sawyer Law Group, P.C.

(57) ABSTRACT

A system and method for preventing contamination of an array of fiber optic connectors. The system includes a housing for retaining the array of fiber optic connectors in an adjacent relation and an arrangement for delivering pressurized gas into said housing to prevent external contamination entering said housing and causing debris on a surface of one or more of the connectors. A control arrangement is provided for deactivating air flow after all optical connections are covered and protected from contamination.

20 Claims, 7 Drawing Sheets

SYSTEM AND METHOD FOR DUST CONTAMINATION PREVENTION AND REMOVAL IN FIBER-OPTIC PANEL-MOUNT ASSEMBLIES

FIELD OF THE INVENTION

This invention relates to fiber optic systems. More specifically, the present disclosure relates to systems and methods for preventing debris and contamination from dense arrays of fiber optic connectors.

BACKGROUND

Optical fibers are widely used for high speed data communication. An optical fiber is a flexible, transparent fiber made of glass (silica) or plastic. It functions as a waveguide, or "light pipe", to transmit light between the two ends of the fiber. Optical fibers typically include a transparent core surrounded by a transparent cladding material with a lower index of refraction. Light is kept in the core by total internal reflection. This causes the fiber to act as a waveguide. Joining lengths of optical fiber is more complex than joining electrical wire or cable. The ends of the fibers must be carefully cleaved, and then spliced together, either mechanically or by fusing them with heat. For this reason, optical fiber connectors have been developed to facilitate fast easy removable connections.

An optical fiber connector terminates the end of an optical fiber, and enables quicker connection and disconnection than splicing. The connectors mechanically couple and align the cores of fibers so light can pass. Better connectors lose very little light due to reflection or misalignment of the fibers.

Optical fiber connectors are used to join optical fibers where a connect/disconnect capability is required. The basic connector unit is a connector assembly. A connector assembly consists of an adapter and two connector plugs. Most optical fiber connectors are spring-loaded, so the fiber faces are pressed together when the connectors are mated. The resulting glass-to-glass or plastic-to-plastic contact eliminates signal losses that would be caused by an air gap between the joined fibers.

Unfortunately, fiber channel contaminations are responsible for many, if not most, of the fiber optic connectivity and signal integrity problems. The main sources of such contaminations are: debris generated from normal wear in mating and de-mating, dust, airborne particulates, residues from end caps, skin oil, and alcohol residue.

Hence, fiber channel connectors must be protected from contamination and/or cleaned to prevent connectivity and signal integrity problems. Common prevention methods include: use of end caps on open (non-engaged) connectors and use of specially designed shutter-protected connector space entries. Common cleaning methods include: dry cleaning and wet cleaning techniques.

As is known in the art, many systems use dense arrays of optical connectors in form of a backplane or panel. In most cases, these products are built with assumptions that: 1) individual external cables can be removed from such a panel and 2) external cable's connector and the connector on the backplane—can be accessed for cleaning individually Highly dense bundles of connectors that can be plugged and unplugged together have been recently developed. Unfortunately, in these systems, with large arrays of fiber optic connectors, ganged together on both sides of the interconnect, access to the backplane-installed side of connectors can be difficult and require removal of the corresponding cable from the backplane structure for cleaning and re-installation. This is not only laborious, but also, by its nature, creates additional debris and dust particles resulting in new contaminants of the channel/connector being cleaned and its neighbors.

Accordingly, a need remains in the art for a system or method for cleaning fiber optic connectors. Particularly, a need remains in the art for a system or method for cleaning fiber optic connectors in closely packed arrays.

SUMMARY

The need in the art is addressed by the system and method of the present disclosure for preventing contamination of fiber optic connectors. In an illustrative system implementation, the disclosure includes a housing for retaining fiber optic connectors and an arrangement for forcing gas into the housing to prevent an accumulation of debris on a surface of one or more of the connectors. In the best mode, the connectors are arranged in arrays. The gas is preferably air, but could be other gases or humidified air to mitigate static electricity buildup. A control arrangement can be added for deactivating air flow during connection of the connectors. The arrangement for deactivating can be provided by mechanical blockage on an insertion of connectors or through external control. External control can be either manual or automatic. Automatic control can be implemented by way of valves and sensors. The sensors could be of various designs, including mechanical, optical, capacitive, proximity, and others.

DETAILED DESCRIPTION

The following description is presented to enable one of ordinary skill in the art to make and use the disclosure and is provided in the context of a patent application and its requirements. Various modifications and the generic principles and features described herein will be readily apparent to those skilled in the art. Thus, the present disclosure is not intended to be limited to the embodiments shown, but is to be accorded the widest scope consistent with the principles and features described herein.

Figure 1:
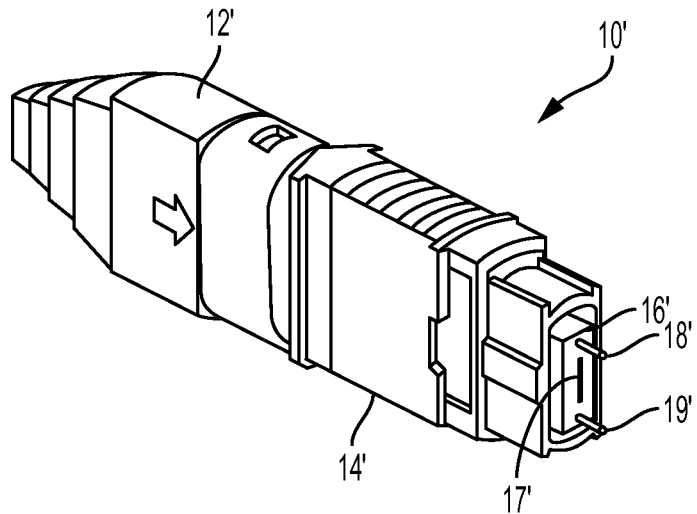
FIG. 1 is a perspective view of an illustrative embodiment of a fiber optic connector in accordance with conventional teachings.

FIG. 1 is a perspective view of an illustrative embodiment of a fiber optic connector in accordance with conventional teachings. The connector 10' is known in the art as a pinned MTP connector. The connector 10' is a 'male' connector includes a boot 12' and a coupling housing assembly 14' through which a ferrule 16' extends. First and second guide pins 18' and 19' are mounted within the ferrule 16' to align optical fibers 17' with fibers disposed in a 'female' connector as depicted in FIG. 2.

Figure 2:
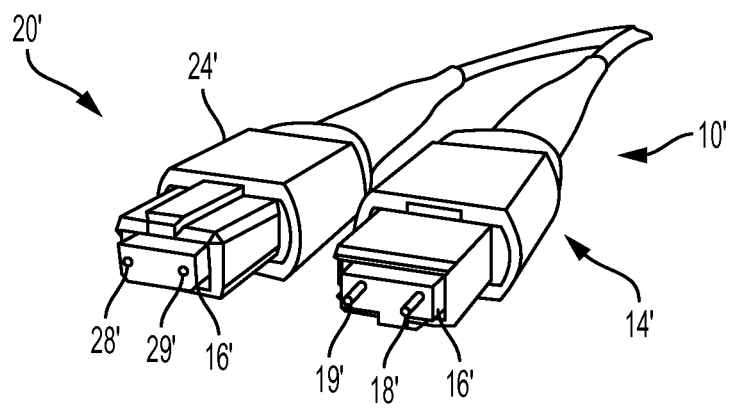
FIG. 2 is a perspective end view of an illustrative embodiment of a fiber optic connector in accordance with conventional teachings.

FIG. 2 is a perspective end view of an illustrative embodiment of a fiber optic connector in accordance with conventional teachings. The female connector 20' has first and second pin receptacles 28' and 29' adapted to receive and hold first and second pins 18' and 19' respectively of the male connector 10'. In this configuration, the fiber optic arrays of each connector 10' and 20' are brought into a close, end-to-end alignment to effectuate optical communication along the lengths of the optical fibers disposed therein.

Figure 3:
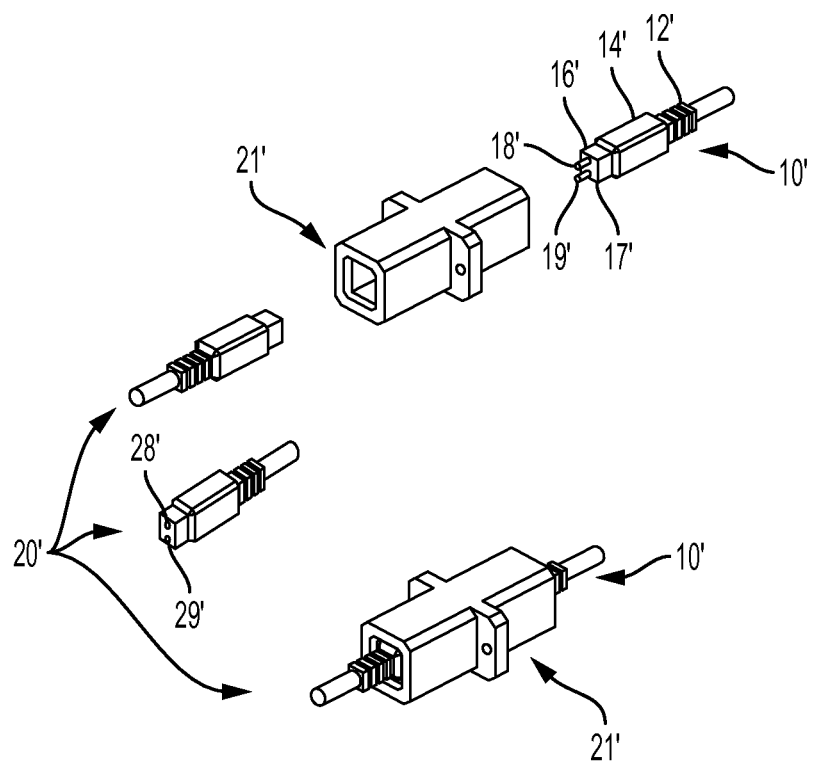
FIG. 3 shows exploded and assembled (connected) views of a housing assembly implemented in accordance with conventional teachings.

FIG. 3 shows exploded and assembled (connected) views of a housing assembly implemented in accordance with conventional teachings. FIG. 3 shows two optical connectors, male 10' and female 20' that are coupled in a traditional way through/within a coupling device 21' that receives the two connectors from opposite sides and mechanically retains and roughly aligns the connectors for the final connection inside. Such a coupling device 21' usually is produced with a mechanical attachment option in order to mount it into some sort of assembly. As noted above, when the connectors are plugged in, there is no need for cleaning.

Figure 4:
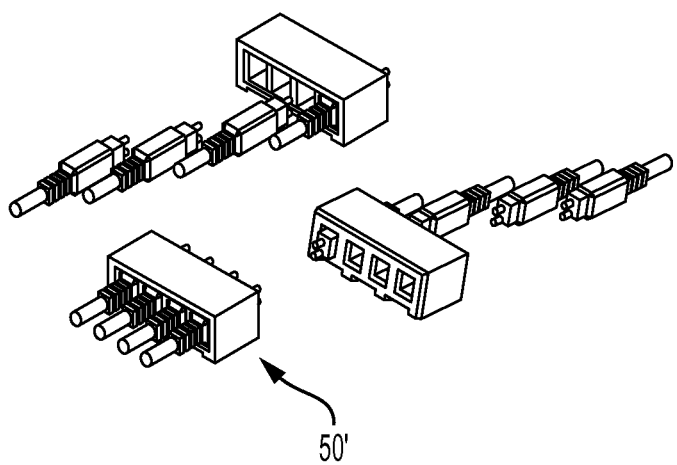
FIG. 4 shows multiple connectors ganged together in a single housing assembly in accordance with conventional teachings.

However, as shown in FIG. 4, fiber optic connectors are currently being packed ever higher numbers in increasingly dense assemblies (or gangs) making manual cleaning impractical.

Accordingly, a need remains in the art for a system or method for cleaning fiber optic connectors. Particularly, a need remains in the art for a system or method for cleaning fiber optic connectors in closely packed arrays.

In accordance with the present teachings, pressurized and mechanically filtered air with, e.g. a positive pressurization gradient in the range of 0.03" to 0.05" (~0.75 mm to 1.25 mm) water column, is blown into the inner volume between connectors to prevent the accumulation of dust or debris therein. Externally sourced contamination is thereby prevented from entering the receptacle space, while internally created particles will be discharged by the air flow.

As discussed more fully below, a mechanism or sensor/switch/control regulates the pumping of the compressed air into the inner volume when the plug is being removed and inhibits the air delivery upon completion of the connection.

Optionally, moisture is added to the air flow to prevent any undesirable static build-up that may create a dust attracting force opposite to the main airflow as discussed more fully below.

Figure 5:
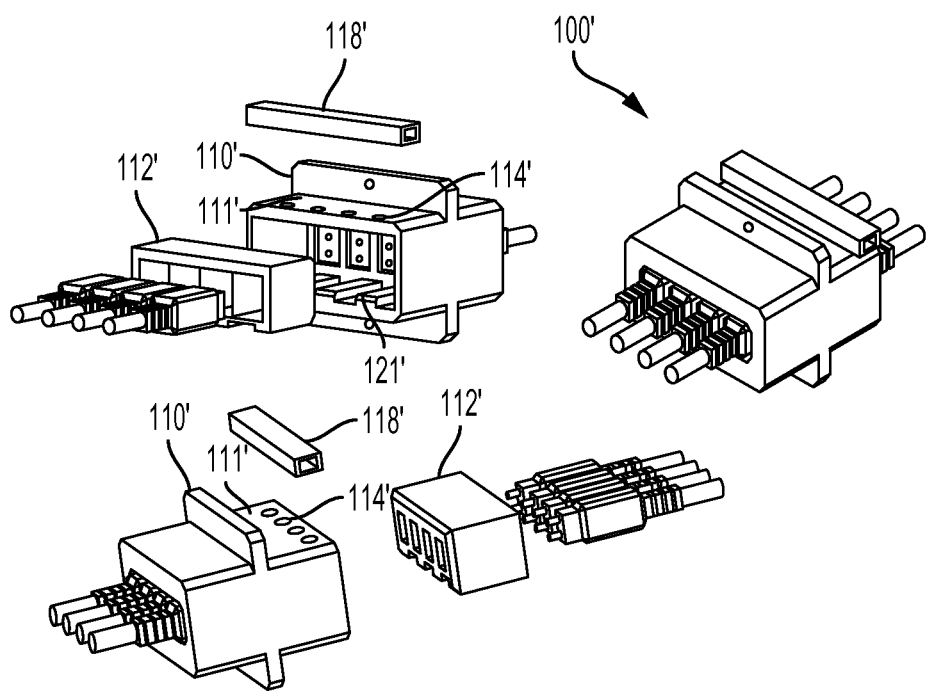
FIG. 5 is a simplified perspective view of an optical fiber connector implemented in accordance with an illustrative embodiment of the present teachings.

FIG. 5 is a simplified perspective view of an optical fiber connector implemented in accordance with an illustrative embodiment of the present teachings. As shown in the Figure, the connector 100' includes a housing 110' adapted to receive and retain the bulkhead 112' of a mating male connector. The bulkhead 112' is adapted to receive and retain multiple connectors 20' and 10' respectively. The housing 110' serves to retain and guide two bulkheads 112' such that groups of optical connectors are thereby retained in close proximity sufficient for a final and precise alignment provided by the guiding elements (i.e. pins and receptacles) integrated into the fiber optic ferrule.

As shown in FIG. 5, in accordance with the present disclosure, a plurality of apertures 114' are provided through the top surface 111' of the housing 110' sized to facilitate the flow of air there through. The housing 110' and the bulkhead 112' are made any suitable material such as metal or plastic by way of example.

Figure 6:
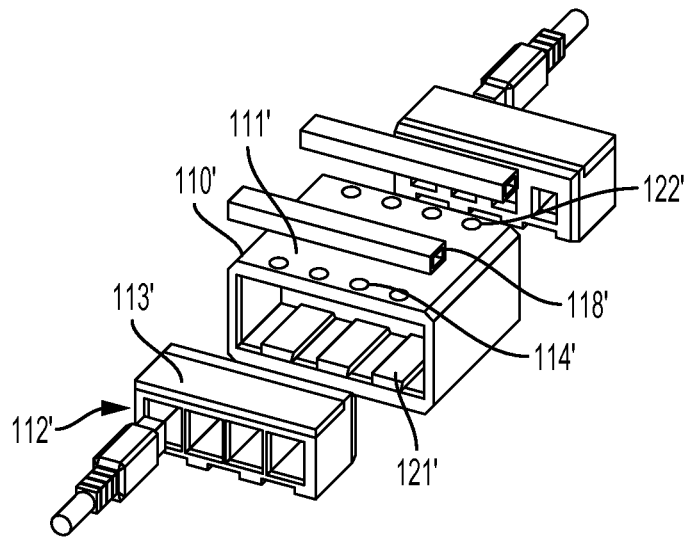
FIG. 6 shows an alternative embodiment in which the coupling housing of FIG. 5 is replaced with a coupling adapter having a second set of apertures.

As shown in FIG. 5, in accordance with the present teachings, a hose or conduit 118' is provided to conduct pressurized air from a source (not shown) to a chamber 121' between the ends of the male and female optical connectors 10' and 20' to prevent dust particles from entering the connection space (chamber 121') there between. Airflow into chamber is initially allowed, while the chamber 121' is opened to the external environment. As shown in FIGS. 5 and 6, as the bulkhead 112' is inserted into the chamber 121' it reaches a position, at which the top surface 113' of the bulkhead 112' mechanically blocks the aperture 114' in the top surface 111' of the housing 110' preventing airflow into the chamber 121' prior to complete engagement of optical connection. On removal of the bulkhead 112', airflow is enabled into the chamber 121' from the hose 118' via the aperture 114'.

FIG. 6 shows an alternative embodiment in which the coupling housing 110' of FIG. 5 is replaced with a coupling adapter 110' having a second set of apertures 122'.

Figure 7:
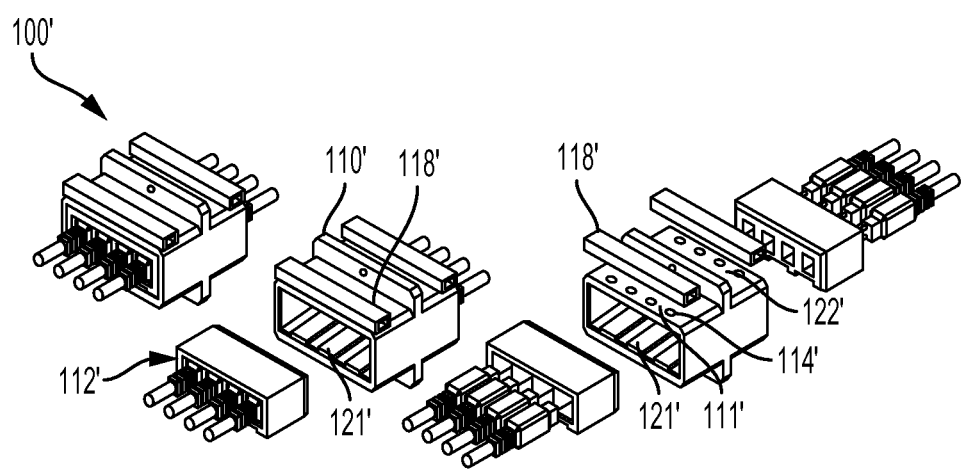
FIG. 7 illustrates the embodiment of FIG. 6 with a series of images showing the adapter with multiple connectors in an assembled, partially disassembled and fully disassembled relation.

FIG. 7 illustrates the embodiment of FIG. 6 with a series of images showing the adapter 110' with multiple connectors in an assembled, partially disassembled and fully disassembled relation.

Figure 8:
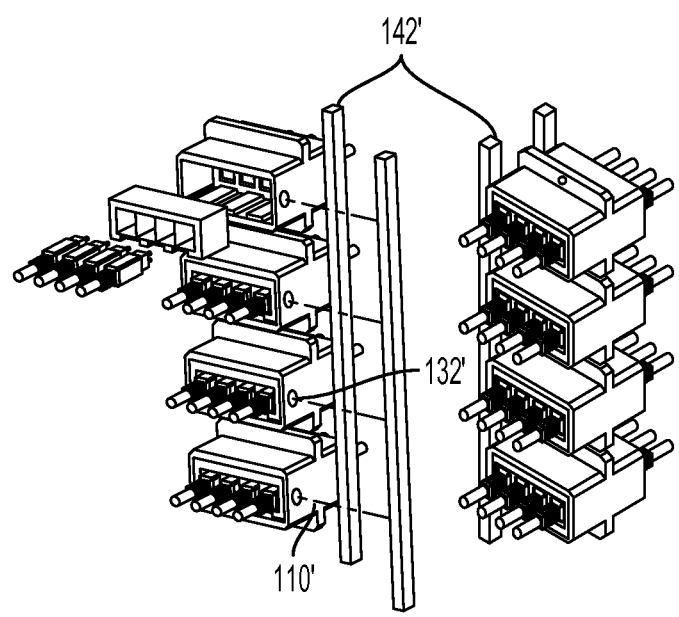
FIG. 8 shows right and left side perspective views of a second alternative embodiment in which the coupling housing of FIG. 6 is replaced with a coupling adapter having a set of apertures mounted on side walls thereof.
Figure 9:
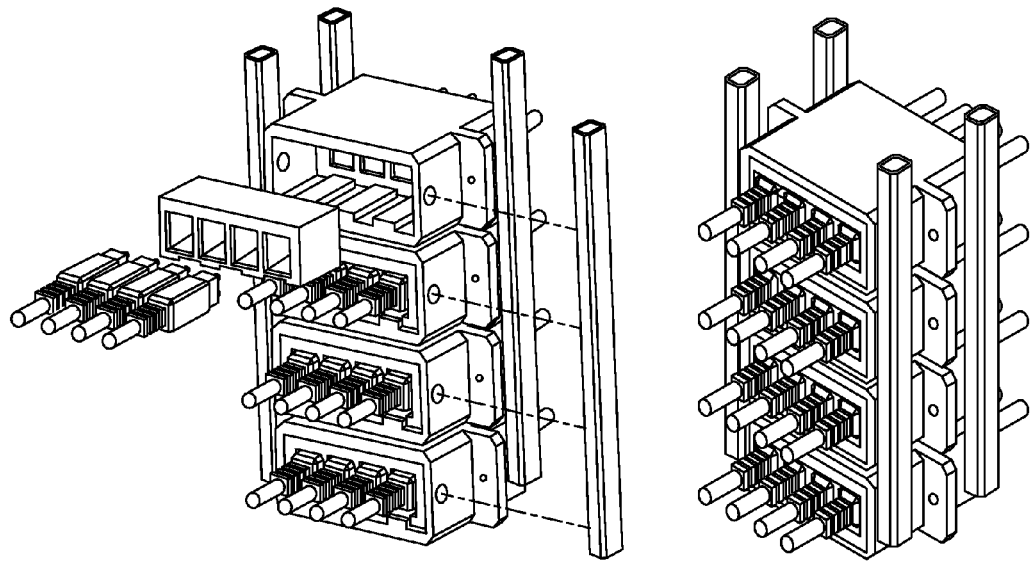
FIG. 9 shows yet another alternative embodiment in which the coupling housing of FIG. 8 is replaced with a coupling adapter having a set of apertures mounted on both opposite side walls thereof.

FIGS. 8 and 9 illustrate that the apertures can be implemented at various locations in various ways to reflect the intended assembly orientation without departing from the scope of the present teachings.

FIG. 8 shows right and left side perspective views of a second alternative embodiment in which the coupling housing 110' of FIG. 6 is replaced with a coupling adapter 110' having a set of apertures 132' mounted on side walls thereof. In FIG. 8 multiple coupling elements 110" are stacked vertically and side fed with pressurized air via a conduit 142'.

FIG. 9 shows yet another alternative embodiment in which the coupling housing 110' of FIG. 8 is replaced with a coupling adapter 110' having a set of apertures 132' mounted on both opposite side walls thereof.

Figure 10:
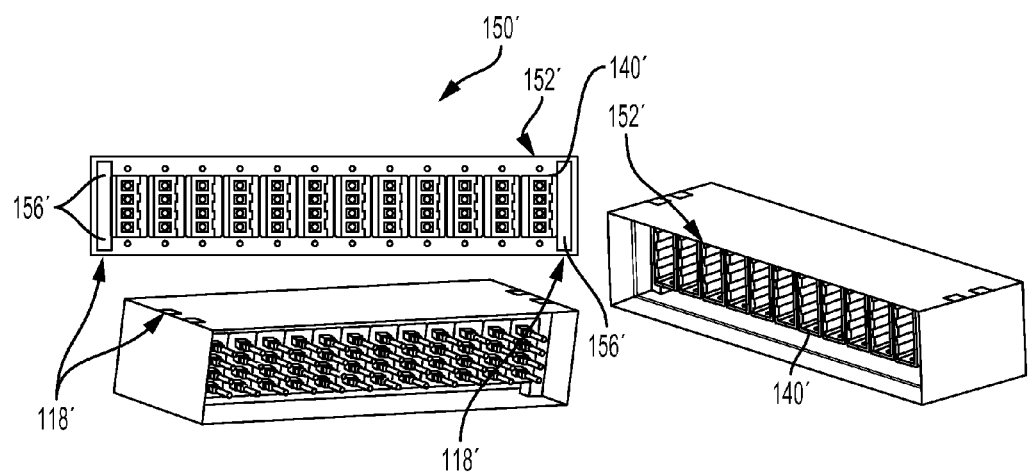
FIG. 10 is another alternative embodiment in which a stack of coupling elements are fed by compressed air with an assembled array of coupling adapters mounted within a surrounding shroud.

FIG. 10 is another alternative embodiment in which a stack 140' of coupling elements 110' are fed by compressed air, but instead of providing airflow directly into the chamber 121' as discussed above, an assembled array 140' of coupling adapters 110' can be mounted within a surrounding shroud, i.e. an open box 152' immediately outside of the assembly 140'. The assembly 140' is attached to a mounting panel that reflects airflow toward the opened entry into the box 152'. In this embodiment, air would be delivered into the shroud 152' space through apertures 156' until all of the to-be-protected connections are closed by the corresponding bulkheads (either the bulkhead 112' with the optical connectors 10' or 20' installed therein or a "dummy" bulkhead cover installed to cover/protect entry into coupler space 121' when and where no external cables are available).

As discussed more fully below, if entry sensors, valves and control logic are used, in accordance with the present teachings, then when all the sensors indicate that the connection space is secured, control logic (not shown) may be implemented to close air supply valves.

Figure 11:
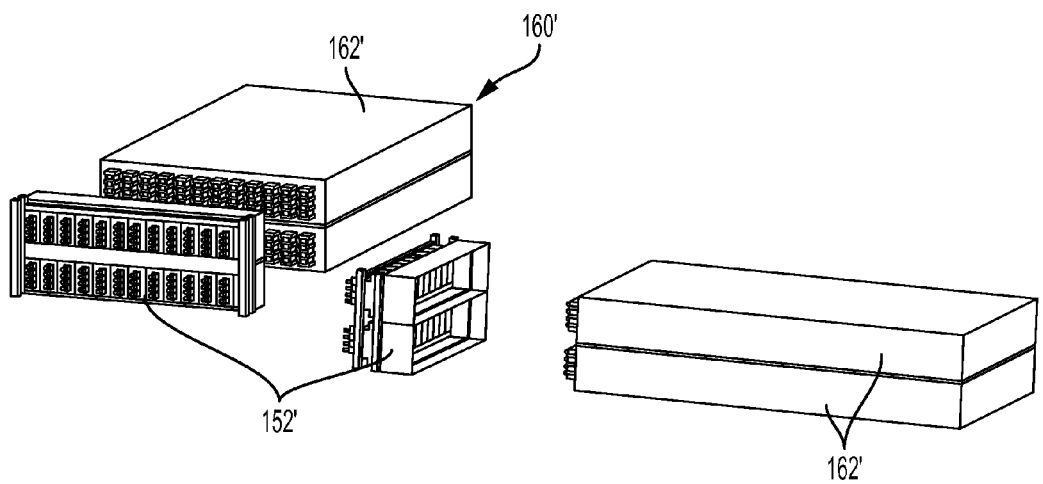
FIG. 11 shows yet another embodiment in which multiple coupling bulkheads are combined into a single assembly.

FIG. 11 shows yet another embodiment in which multiple coupling bulkheads are combined into a single assembly 162'. This embodiment also delivers air into a shroud 152', but does not monitor completion of individual bulkhead installation via an external control system and, therefore, does not require any modifications to the bulkhead design. Instead, all of the bulkheads are combined into a single assembly 162' that fits into the shroud 152' space. All of the bulkheads 112' are "blind" engaged within the mating optical coupler's space. When the assembly 162' closes the entry into the shroud's 152' space, airflow is stopped by one of the mechanical, electrical or optical methods described herein, including, by way of example, and without limitation:

1. the assembly 162' is adapted to physically block airflow into shroud 152' by arrangement of a soft/compressible material installed on the outer surface of the assembly 162' that blocks air inlet 156';
2. the assembly 162' is sensed by a sensor (not shown) installed at the entry into shroud 152' that causes an electronically controlled valve to close the air supply into the system under conditions that all other sensors indicate that the rest of optical ports are protected from contamination; or
3. no air pumping or delivery is stopped by any automated arrangement. In this case, the inserted connector/bulkhead/assembly naturally increases resistance to the source of the compressed air. However, air continues to "leak" through available slots and outlets. Since the optical interconnect space is now protected by being enclosed within the coupler/shroud space, an operator (field service staff) may explicitly turn the pumping action OFF. The pumping is manually re-engaged just before opening the interconnect space for next service action (like: replacement, addition, reconfiguration of system's components).

Figure 12:
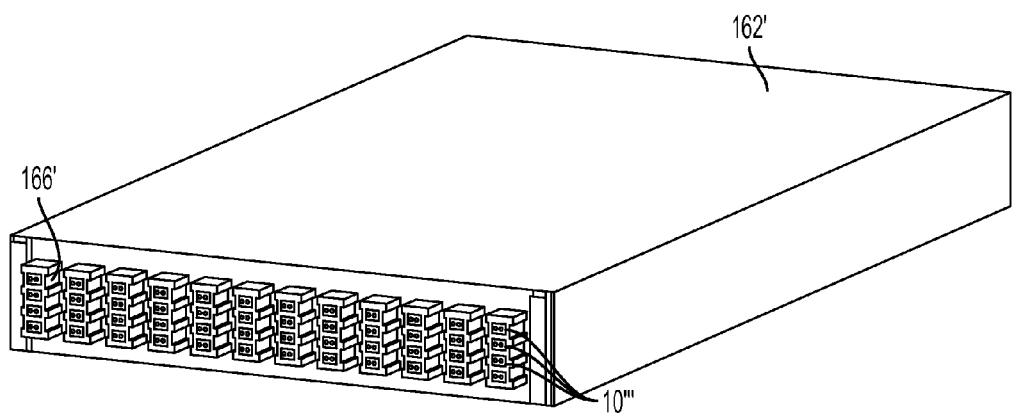
FIG. 12 shows a front view of a drawer enclosure for use with the embodiment of FIG. 11.

FIG. 12 shows a front view of a drawer enclosure for use with the embodiment of FIG. 11. The drawer enclosure 162' is to be installable into a rack (e.g. a 19-inch rack) with multiple optical connectors 10''' assembled at one end of the panel in form of an array 166'. Multiple drawers 162' could be installed next to each other within a rack. There would be limited access to the back of the rack structure "optical backplane", where multiple optical connectors 110''' devices are installed. The shroud 152' is adapted to accept the front end of the drawer as an assembly 162' with all the optical connectors 10''' pre-assembled into multiple bulkheads 112'.

During the service/assembly performance, air will be pumped into the inner space of each of shroud 152' units. When/after either an individual drawer installation is detected, for an automatic stop of air pumping into the corresponding space, or—with no detection—installation/configuration is completed, the air delivery will be stopped either automatically—one shroud 152' at the time—or manually by the operator.

In order to control airflow by a simple mechanical blockage, design of bulkhead 112' and housing 110' should be such that they allow mechanical motion/coupling of optical connectors 10' and 20', while still having an arrangement (e.g. compressible materials) to block airflow. Air flow also could be blocked by other arrangements. For example, air flow could be blocked by an electronically controlled valve engaged by a sensor actuated by a bulkhead.

Air flow can be delivered from numerous sources including, by way of example and without limitation:

1. compressed air system connected to the product assembly;
2. dedicated fan/blower/air-pump/air-compressor;
3. air flow produced for other purposes inside the assembly (e.g. cooling) by fans/blowers, for example; or
4. dedicated compressed air tank installed inside assembly;

In general, all that is required is the creation of a positive or negative pressure gradient sufficient to effect enough air flow between optical connectors to prevent an accumulation of debris between connectors.

As noted above, water vapor or other sources of moisture can be added to the airflow to minimize a buildup of static electricity. Humidity delivery can be implemented in many ways. For example, in many liquid-cooled electronics systems, tanks or other reservoirs serve as spare liquid storage for compensation of the cooling liquid loss within the cooling system. Such tanks have some part of its space filled with air, and that air is above ambient humid. By pumping the air flow into and through such a tank, the exhaust air will be prevented from being dry and may be used for the airflow into the inventive system.

Another option can be a dedicated and closed reservoir with wet "sponge" material. During an idle period (no pumped air), the natural evaporations from such reservoir would be minimal as they would be limited by small convection through the intake/exhaust tubing. During the forced airflow, air motion along the surface of the sponge would cause air moisturizing and propagation of the liquid from the bottom of reservoir to the exposed-to-air sponge surface.

If and when the airflow is not automatically controlled by a constantly present above-ambient pressure air source and corresponding blocking ports/valves, but is manually turned ON/OFF by a service person, the source of the moisture can be delivered through the original/external port of air entry by simply attaching a cover, that has IN/OUT air outlets, on a side a container with liquid. After completion of the service and turning off the air source, such a container can be removed and disconnected until next use.

The system may be left running to continuously pump or trying to pump air, but is intended to be switched OFF every time the protected optical ports are covered by either corresponding complementary connectors or connector assemblies or by protection "blank" bulkheads with no optical cables installed.

Although the present disclosure has been described in accordance with the embodiments shown, one of ordinary skill in the art will readily recognize that there could be variations to the embodiments and those variations would be within the spirit and scope of the present disclosure. Accordingly, many modifications may be made by one of ordinary skill in the art without departing from the spirit and scope of the present disclosure.

What is claimed is:

1. A system comprising:
    a housing for receiving and retaining a bulkhead; wherein the bulkhead is adapted to receive and retain a plurality of optical connectors that are in closely packed arrays; and
    an arrangement for delivering pressurized gas into said housing between ends of the plurality of optical connectors to prevent dust particles from entering a connection space therebetween.
2. The system of claim 1 wherein said gas is air.

3. The system of claim 2 including control arrangement for deactivating air flow during connection of said connectors.

4. The system of claim 3 wherein said arrangement for deactivating is provided by mechanical blockage by insertion of a bulkhead into the housing.

5. The system of claim 3 wherein said arrangement for deactivating includes a sensor coupled to a control system.

6. The system of claim 1 wherein said gas includes humidified air.

7. The system of claim 6 including a control mechanism for deactivating gas flow during connection of optical connectors.

8. The system of claim 7 wherein said arrangement for deactivating is a bulkhead housing of said connectors.

9. The system of claim 7 wherein said arrangement for deactivating is a sensor and a control system.

10. A system comprising:
   a housing for receiving and retaining a bulkhead; wherein the bulkhead is adapted to receive and retain closely packed arrays of a plurality of fiber optic connectors in adjacent relation;
   arrangement for delivering pressurized gas into said housing between ends of the plurality of fiber optic connectors to prevent dust particles from entering a connection space therebetween; and
   a control arrangement for deactivating air flow during connection of connectors.

11. The system of claim 10 wherein said arrangement for deactivating is a bulkhead.

12. The system of claim 10 wherein said arrangement for deactivating is a sensor coupled to a control system.

13. The system of claim 10 wherein said housing is a shroud.

14. The system of claim 13 further including a drawer assembly adapted to retain multiple coupling bulkheads.

15. The system of claim 14 wherein said control arrangement includes soft compressible material installed on the outer surface of the drawer assembly.

16. The system of claim 14 wherein said control arrangement includes a sensor installed at an entry into the shroud that causes an electronically controlled valve to close air supply into the system under conditions that other sensors indicate that a predetermined number of optical ports are protected from contamination.

17. The system of claim 14 wherein said shroud is a rack adapted to receive and retain multiple drawer assemblies.

18. The system of claim 10 including an arrangement for increasing the level of humidity of said gas.

19. A method comprising the steps of:
   mounting fiber optic connectors in a housing for receiving and retaining a bulkhead; wherein the bulkhead is adapted to receive and retain a plurality of optical connectors that are in closely packed arrays and
   delivering pressurized gas into the housing between ends of the plurality of optical connectors to prevent dust particles from entering a connection space therebetween.

20. The method of claim 19 further including the step of selectively deactivating flow of said pressurized gas into said housing during the connection of said connectors.

* * * * *